US007155937B2

(12) United States Patent
Garnier et al.

(10) Patent No.: US 7,155,937 B2
(45) Date of Patent: Jan. 2, 2007

(54) METHOD AND DEVICE FOR BENDING A GLASS SHEET

(75) Inventors: Gilles Garnier, Thourotte (FR);
Thierry Olivier, Thourotte (FR);
Christophe Machura, Chevincourt (FR)

(73) Assignee: Saint-Gobain Glass France, Courbevoie (FR)

( * ) Notice: Subject to any disclaimer, the term of this patent is extended or adjusted under 35 U.S.C. 154(b) by 536 days.

(21) Appl. No.: 10/332,766

(22) PCT Filed: Jul. 11, 2001

(86) PCT No.: PCT/FR01/02238

§ 371 (c)(1),
(2), (4) Date: Apr. 25, 2003

(87) PCT Pub. No.: WO02/06170

PCT Pub. Date: Jan. 24, 2002

(65) Prior Publication Data

US 2003/0154745 A1 Aug. 21, 2003

(30) Foreign Application Priority Data

Jul. 13, 2000 (FR) .................................. 00 09270
Nov. 29, 2000 (FR) .................................. 00 15395

(51) Int. Cl.
*C03B 27/044* (2006.01)
(52) U.S. Cl. ............................ 65/104; 65/106; 65/114; 65/254; 65/273; 65/287; 65/370.1
(58) Field of Classification Search .................. 65/104, 65/106, 107, 114, 117, 118, 253, 254, 273, 65/287, 349, 370.1
See application file for complete search history.

(56) References Cited

U.S. PATENT DOCUMENTS

| 4,058,200 | A | * | 11/1977 | Frank ........................... 198/382 |
| 4,670,036 | A | * | 6/1987 | Enk et al. ...................... 65/106 |
| 4,865,638 | A | * | 9/1989 | Kudo ............................ 65/273 |
| 4,883,526 | A | | 11/1989 | Enk et al. |
| 5,286,271 | A | | 2/1994 | Rueter et al. |
| 5,651,805 | A | * | 7/1997 | Kuster et al. .................. 65/273 |
| 5,735,922 | A | * | 4/1998 | Woodward et al. ........... 65/104 |

FOREIGN PATENT DOCUMENTS

| EP | 0 062 814 | 10/1982 |
| EP | 0 677 491 | 10/1995 |
| FR | 2 275 413 | 6/1975 |

OTHER PUBLICATIONS

U.S. Appl. No. 10/578,779, filed May 9, 2006, Leclercq.

* cited by examiner

*Primary Examiner*—Sean Vincent
(74) *Attorney, Agent, or Firm*—Oblon, Spivak, McClelland, Maier & Neustadt, P.C.

(57) ABSTRACT

A method for bending a sheet of glass involving heating the sheet of glass to a softening temperature, transporting the sheet of glass in an essentially horizontal path as far as a station for bending the sheet of glass between two forms, shaping the sheet of glass by pressing between the two forms, and cooling the sheet of glass in an appropriate station. Shaped rollers receive the sheet of glass after it has been bent and the rollers are oriented parallel to the direction defined on the sheet of glass by the direction in which it is conveyed into the bending station.

20 Claims, 8 Drawing Sheets

METHOD AND DEVICE FOR BENDING A GLASS SHEET

TECHNICAL FIELD

The invention relates to a technique for bending a sheet of glass, followed by a cooling step. The technique according to the invention is either suited to bending a sheet of glass particularly intended to be toughened, or to bending sheets of glass which are then cooled and assembled in twos to form laminated glazing.

Although it is not restricted to such applications, the invention will be described more specifically with reference to the shaping of sheets of glass intended to equip the lateral parts of motor vehicles.

BACKGROUND OF THE INVENTION

More specifically, the invention relates to those of these techniques whereby the sheets of glass are conveyed one by one through a heating furnace so that their temperature can be raised to a temperature near to the softening temperature, the sheets of glass being conveyed on a bed of rollers. The sheets of glass are then led, as soon as they leave the furnace, to a bending station in which a lower form lifts up a sheet of glass to press it against an upper form to obtain the desired shape. The sheet of glass is then set back down on the conveyor to be led to the cooling station such as a toughening station.

These bending techniques are described in particular in document U.S. Pat. No. 4,872,898. That document particularly describes a technique whereby a sheet of glass is transported on a roller conveyor through a tunnel furnace in which its temperature is raised to its softening temperature, and is then led to a bending station. In the bending station, the sheet of glass is lifted up from the conveyor by a frame which has the shape that the sheet of glass is to be given. The frame is discontinuous so that it can pass through the bed of rollers on which the sheet of glass initially rests. The frame then lifts the sheet of glass up to press it against a solid upper form, the shape of which complements that of the frame and therefore corresponds to the desired shape for the sheet of glass. After pressing, the lower frame drops back down to a level below the bed of rollers and thus sets the sheet of glass back down on said bed of rollers. The rollers then resume their movement to lead the sheet of glass to the toughening station.

Other documents describe variations on this type of technique. In particular as regards the lower frame and, more especially, its configuration to allow it to pass through the bed of rollers. Other documents describe even more variations on the designs of the rollers within the bending station, always with a view to facilitating the passage of the lower frame.

Aside from the special feature of the lower frame which passes through the bed of rollers which acts as a conveyor, this type of technique is characterized in that the bending operation is performed outside the furnace or at the very least outside of an enclosure which is maintained at temperature. This type of technique has therefore to be considered as a cold technique, this nomenclature defining the fact that the bending station is sited outside an enclosure that is maintained at temperature. What this means is that it is easier to control the positioning of the bending tools than it is in the case of hot techniques and that, on the other hand, the bending method is a race against time because as soon as it leaves the furnace, the sheet of glass will start to cool. Modifications to the bending operation or to its conditions are therefore tricky and limited.

Furthermore, recent developments, particularly in the automobile industry, are tending toward an ever increasing demand for glazings of a complex shape, particularly with very pronounced curvature. At the same time, the optical quality demanded is becoming ever higher. What is more, the thickness of the glazing is also reducing.

As regards the shaping of the lateral glazing for the motor industry on a tool using this technology, the direction of travel of the sheets of glass as they pass through the furnace on the roller conveyor is dictated by later usage considerations. Specifically, it is not desirable for marks to appear in a direction that is essentially vertical when the sheet of glass is in the use condition, which marks may be left by the rollers as the temperature increases; if such marks exist, they actually become highly visible from certain angles to an observer who is, for example, facing the motor vehicle. Thus, the direction in which said sheets of glass travel is dictated by the fact of ensuring that these marks are seen in an essentially horizontal direction and are therefore practically invisible to an observer.

Present-day demands by manufacturers are also imposing significant curvatures in the vertical direction after the sheet of glass has been mounted on the motor vehicle. This significant curvature will therefore correspond to a direction of bending corresponding to that of the conveyor in the furnace. It is thus tricky to be able to transport the sheets of glass after bending on a roller conveyor, these rollers being perpendicular to the direction of bending, without the risk of breaking or deforming the sheets of glass, these then remaining supported only by their central part. It is also desirable, particularly for good process repeatability, to maintain the shape obtained after pressing and not allow it to change between the pressing station and the cooling station.

Solutions for preventing deformation of the sheet of glass after it has passed through the pressing station have already been proposed. Document EP 0 523 017 in particular describes the use of a shuttle or moving frame which has the final shape of the sheet of glass for leading the latter from the bending station to the cooling station. Document U.S. Pat. No. 4,433,993 also provides a shuttle which takes a direction traversal to the direction of the conveyor passing through the furnace. These techniques allow the sheet of glass to be taken in hand immediately after pressing, so as to maintain the shape obtained and rapidly lead the sheet of glass to the cooling zone. These techniques do, however, have drawbacks; first of all, the travel of the shuttle entails indexing for each transfer operation, so that the sheet of glass is perfectly received. Furthermore, as the sheet of glass is supported at its periphery by a frame, cooling is not uniform; this disadvantage is particularly troublesome when the sheets of glass are annealed or semi-toughened for producing laminated glazing, or alternatively toughened. What happens in these various scenarios is that problems arise at the edges and lead to weakening of the glazing.

SUMMARY OF THE INVENTION

The inventors therefore set themselves the task of developing a bending technique that was particularly well suited to the bending of thin sheets of glass, which has the advantages of the techniques mentioned earlier, particularly the absence of visible markings when the glazing is used, but which does not have their drawbacks and in particular which make it possible to perform subsequent cooling of the sheets of glass without problem at the periphery of the sheets of glass.

This object was achieved according to the invention by a method for bending a sheet of glass involving heating the sheet of glass, transporting the sheet of glass in an essentially horizontal path as far as a station for bending it between two forms, shaping the sheet of glass by pressing between the two forms, cooling the sheet of glass in an appropriate station, means comprising shaped rollers receiving the sheet of glass after it has been bent, said shaped rollers being oriented parallel to the direction defined on the sheet of glass via the direction in which it is conveyed into the bending station.

According to the invention, after the pressing phase, the sheet of glass is set back down after pressing and therefore after shaping, on rollers which are themselves shaped and which will make it possible to maintain the shape obtained and avoid unwanted additional deformation. In order to achieve this result, the rollers are oriented parallel to the direction defined on the sheet of glass by the direction in which it is conveyed through the bending station; that is to say in the case of lateral glazing for motor vehicles which have a main curvature in the vertical direction when they are in use and which travel through the furnace in this vertical direction, the shaped rollers which receive the sheet of glass after pressing are oriented at right angles to the vertical direction of the sheet of glass when the latter is mounted in a motor vehicle.

According to a preferred embodiment of the invention, the means comprising the shaped rollers are at least one shuttle, advantageously able to move between the bending station and a cooling station.

The use, by way of means comprising shaped rollers, of a shuttle which is preferably able to move between the bending station and a cooling station makes it possible for the shaped rollers to be interposed easily between the upper form and the bed of rollers which conveys the sheet of glass from the heating furnace to the bending station.

According to a first alternative form of the embodiment of the invention, the sheet of glass is transported to the cooling station in a direction which is lateral with respect to the direction in which said sheet of glass is conveyed to the bending station. According to this embodiment, the shaped rollers are therefore arranged in such a way as to form a lateral receiving bed advantageously at right angles to the conveyor conveying into the bending station. According to such an embodiment, the invention may also provide a cooling station on each side of the conveying conveyor. Such an embodiment therefore consists either in conveying the sheets of glass alternately from each of the sides, for example using one and the same shuttle, or, for example, using two shuttles each having shaped rollers. This last embodiment may in particular makes it possible to increase production rates.

According to a second alternative form of the embodiment according to the invention, the sheet of glass is kept in contact with the upper bending form after pressing and it undergoes a rotation through an angle of 90° to then be transported to the cooling station in the direction in which it is conveyed to the bending station. The invention thus, according to this alternative form, anticipates positioning the shaped rollers parallel to the rollers of the conveyor for conveying from the furnace to the bending station. Such a configuration allows a linear design which essentially has the advantage of modifying existing plant simply by adding a rotation element.

According to a last alternative form of the invention, it is anticipated for the first two alternative forms to be combined, that is to say that it is anticipated to be able to convey the sheets of glass after they have been pressed to a cooling station aligned with the conveyor for conveying to the bending station and to at least one cooling station positioned laterally. The sheets of glass are then advantageously conveyed by shuttles, each associated with a cooling station, particularly with a view to increasing production rates.

One advantageous embodiment of the invention anticipates the sheet of glass being able to move on the shuttle comprising the shaped rollers. Such an embodiment also makes it possible to limit the risks of marking the glass, the sheet of glass not remaining motionless on the shaped rollers. What happens is that at this stage of the method, the sheet of glass is still hot enough that there is a risk of it becoming marked if it remains motionless on the rollers. Although such marking is not oriented in a direction that is evident in a way that would trouble an observer, it may none the less be desirable to prevent the appearance of such marks in order to achieve better optical quality.

As regards the movement of the shuttle or, more precisely, of the means carrying the shaped rollers, the invention anticipates two possibilities: in a first embodiment, said shuttle moves from the bending station to the entry of the cooling station to set the sheet of glass down on another conveyor, for example a roller conveyor. In a second embodiment which is more specifically suited to the case of several cooling stations, the shuttle enters the cooling station and supports the sheet of glass for at least part of the cooling time; the set sheet of glass is then picked up by a conveyor, for example a roller conveyor, the rollers of this one not necessarily being shaped. In both instances, the passage from the shuttle to the conveyor of the cooling station occurs naturally by driving the shaped rollers of the shuttle which leads the sheet of glass onto the conveyor of the cooling station.

In a preferred embodiment of the invention, it is anticipated that the sheet of glass will perform a back-and-forth movement on the shuttle. This embodiment may in particular make it possible to have a shuttle of limited length on which the sheet of glass will not remain motionless until it is transferred onto the conveyor of the cooling station.

According to another type of embodiment of the invention, the means comprising the shaped rollers are at least one shuttle, advantageously able to move between the bending station and a standby station.

An advantageous embodiment of this last embodiment anticipates the shaped rollers carried by the shuttle removing the bent sheet of glass to at least one cooling station in a direction which is lateral with respect to the direction in which said sheet of glass is conveyed to the bending station.

Such an embodiment of the invention consists in using a removal shuttle which is brought, once the sheet of glass has been bent, from a standby position under the upper form which may, for example, hold said sheet of glass, the latter then being set back down onto the shuttle. The shaped rollers are then actuated to remove the sheet of glass to a cooling station provided in a lateral direction. As soon as it leaves the shaped rollers of the shuttle, the sheet of glass is advantageously taken up by a conveyor passing through the cooling station, said conveyor for example consisting of shaped rollers. In an advantageous alternative form of the invention, two cooling stations are provided laterally one on each side of the direction in which the sheet of glass is conveyed into the bending station. Such a configuration makes it possible to increase production rates; advantageously, the sheets of glass are removed alternately to one cooling station and then the other. To do this, the shaped rollers are actuated alternately in one direction of rotation then the other. It is also advantageously anticipated for it to be possible for such a cycle to be modified, for example if there is an incident on one cooling station, so that all the sheets of glass can be removed at least temporarily to just one cooling station.

The embodiment set out hereinabove requires a standby position or standby station for the removal shuttle during the operation of bending a sheet of glass. According to the configuration set out, this standby position is advantageously provided in alignment with the conveyor of the furnace, that is to say in alignment with the direction in which the sheet of glass is conveyed to the bending station.

The invention also anticipates an alternative form of embodiment whereby the standby position of such a removal shuttle is provided laterally with respect to the direction in which the sheet of glass is conveyed to the bending station, and the cooling station is provided in alignment with this same direction as the sheet of glass was conveyed to the bending station and therefore in alignment with the furnace conveyor. According to this embodiment, the sheet of glass undergoes a rotation through an angle of 90° before being set down on the removal shuttle.

The invention also proposes a device for implementing the abovementioned method. This bending device according to the invention comprises a furnace for heating a sheet of glass, a device for supporting and transporting the sheet of glass in an essentially horizontal plane through the furnace as far as a bending station comprising two bending forms, a lower form passing through the transport device to press the sheet of glass against an upper form, the latter comprising means for holding a sheet of glass after it has been shaped, and said bending device also comprising at least one cooling station, at least one shuttle carrying shaped rollers receiving a sheet of glass after pressing, it can move between the bending station and another station and the shaped rollers are oriented parallel to the direction defined on the sheet of glass via the direction in which it is conveyed to the bending station.

The device for supporting and transporting the sheet of glass is advantageously a roller conveyor which possibly ends in an air cushion system in the bending station.

The bending device thus described makes it possible, after the step of pressing a sheet of glass, to keep this sheet of glass in contact with the upper form, to bring a shuttle with shaped rollers into the bending station to receive the bent sheet of glass and to maintain the shape thereof as far as the cooling station.

A first embodiment of a device according to the invention advantageously anticipates a shuttle that can move between the bending station and a cooling station.

According to a first alternative form of this embodiment of the invention, the direction of travel of the shuttle is lateral with respect to the direction in which the sheet of glass is conveyed from the furnace to the bending station. According to this embodiment, the shaped rollers are, for example, arranged in a direction perpendicular to the rollers of the conveyor that conveys the sheet of glass from the heating furnace.

According to a second alternative form of this embodiment of the invention, the direction of travel of the shuttle is in the continuation of the direction in which the sheet of glass is conveyed from the furnace to the bending station and the upper form pivots through an angle of 90° after pressing. This other embodiment therefore consists, after pressing, while the sheet of glass is held against the upper form, in causing said upper form to pivot so that the bent sheet of glass can then be set back down on the shaped rollers of the shuttle, said rollers being parallel to the rollers of the conveyor for conveying from the furnace.

A preferred embodiment of the invention according to this first embodiment anticipates the shaped rollers of the shuttle being driven rollers; this embodiment allows the sheet of glass to be set in motion as soon as it is set down on the shuttle.

As a preference also, the shaped rollers have a alternating rotation movement, so as to allow the sheet of glass to be moved back and forth on the shuttle, particularly when the latter is moving.

In an alternative form of embodiment of the invention, the shuttle enters the cooling station. The alternating rotation of the shaped rollers is then particularly advantageous.

A second embodiment of a device according to the invention advantageously anticipates a shuttle that can move between the bending station and a standby station.

According to this second embodiment of the invention, the shaped rollers are rollers which are driven in at least one direction of rotation.

This second embodiment of the device according to the invention therefore essentially consists in a shuttle that can move between a standby station and the bending station, said shuttle carrying shaped rollers which are set in rotation as soon as the bent sheet of glass is set down in order to remove said sheet of glass to a cooling station. The shaped rollers carried by the shuttle are thus positioned under the upper form, advantageously in the continuation of a conveyor with shaped rollers which passes through the cooling station. The sheet of glass is thus transferred from the shaped rollers of the shuttle to the shaped rollers of said conveyor without interruption.

As regards the upper bending form, it advantageously comprises suction means for holding the sheet of glass after pressing. It is also possible to anticipate blowing means which, in particular, accelerate the setting-down of the sheet of glass on the shuttle. Such blowing means are not, of course, used until the suction means are no longer in use. The invention also anticipates the upper form being able to move in a vertical direction, particularly so as to reduce the time involved in setting-down on the shuttle, by moving downward to bring the upper form closer to the shuttle. Such an embodiment also makes it possible to reduce the risks of breaking the sheet of glass, the latter being dropped onto the shuttle from a small height.

The device and the method which have thus been described, according to the invention, make it possible to bend sheets of glass using the cold technique previously described while at the same time in particular allowing good bending accuracy and good optical quality of the sheets of glass which are more especially intended to be used as lateral glazing in motor vehicles.

The device and the method according to the invention actually make it possible to receive the sheets of glass after they have been pressed on the shaped rollers of the shuttle, and therefore to very precisely maintain the desired shape and avoid marking visible to an observer once the glass has been fitted to a vehicle. Such sheets of glass will thus be able to be used as monolithic glazing or assembled in twos to form laminated glazing.

Furthermore, to optimize production rates, the invention advantageously proposes devices which comprise several cooling stations.

In the case of the first device according to the invention, that is to say in the case of a shuttle that can move between the bending station and a cooling station, the invention advantageously anticipates a cooling station in the continuation of the direction of the device that transports the sheet of glass from the furnace to the bending station and/or at least one cooling station oriented laterally with respect to the above direction. According to a preferred embodiment of the invention, it is particularly anticipated for there to be three cooling stations, each one associated with a shuttle, and the upper bending form being able to move about an axis to allow it to rotate through 90°.

In the case of the second device according to the invention, that is to say in the case of a shuttle that can move between the bending station and a standby station, the invention advantageously anticipates two cooling stations arranged laterally, one on each side of the direction in which the sheet of glass is conveyed to the bending station. According to this embodiment, just one removal shuttle is needed to supply the two cooling stations, the rollers being driven in a rotational movement in one direction or the other, preferably alternately, for two consecutive sheets of glass so as to remove two consecutive bent sheets of glass to each of the two cooling stations alternately.

BRIEF DESCRIPTION OF THE DRAWINGS

Other advantageous features and details of the invention will become apparent hereinafter from the description of some exemplary embodiments of the invention given with reference to FIGS. 1 to 4 which depict.

DESCRIPTION OF THE PREFERRED EMBODIMENTS

In order to simplify their understanding, the various figures are not drawn to scale.

Figure 1:
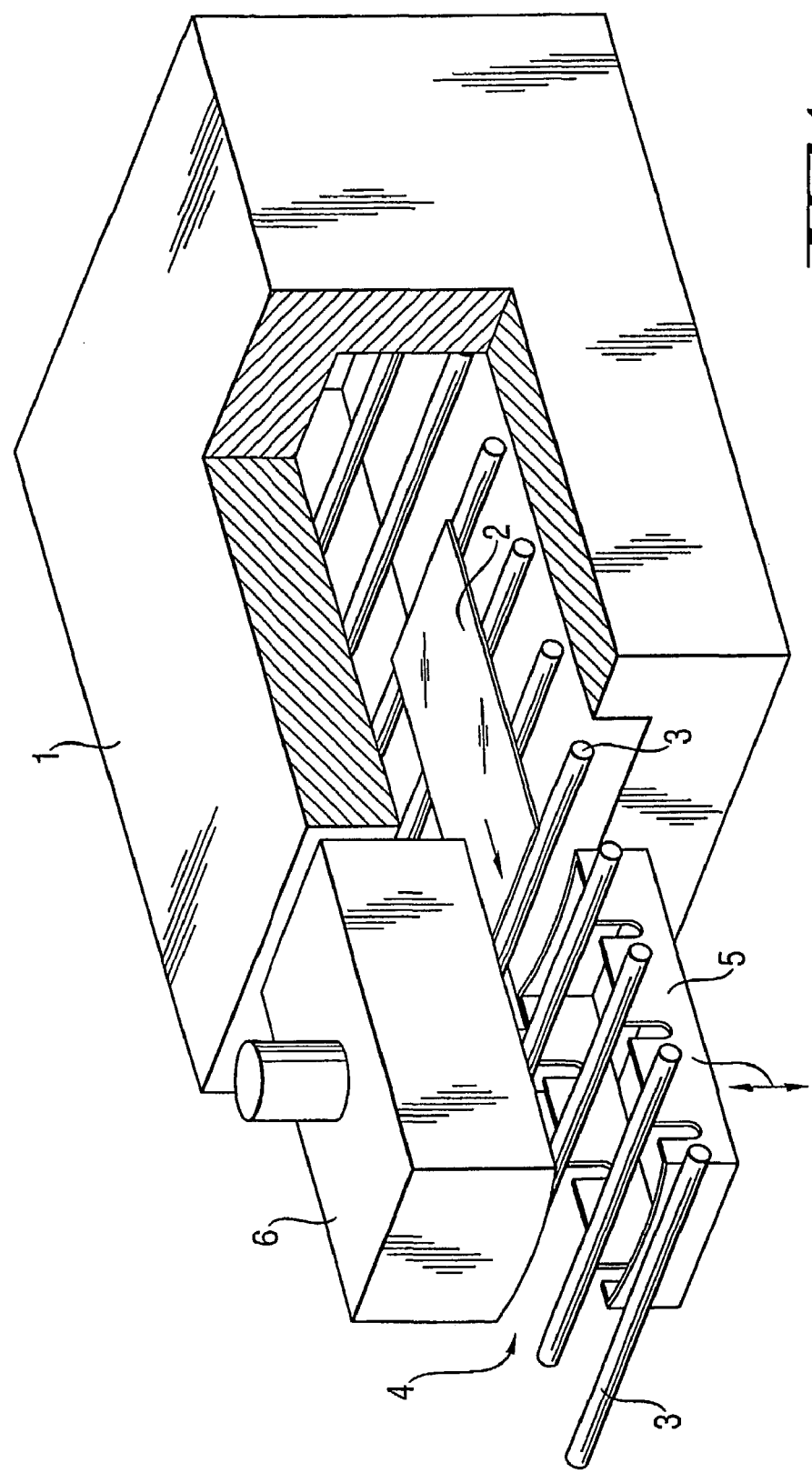
FIG. 1, a schematic view of a bending and cooling line illustrating the technology to which the invention relates, FIGS. 2 and 2a, two diagrams of a first embodiment of a device according to the invention, FIG. 3, a diagram of a second embodiment according to the invention, FIG. 4, a diagram of the second embodiment depicted in FIG. 3 after the pressing step, FIG. 5, a diagram of a third embodiment according to the invention, FIGS. 6 and 6a, two diagrams of a fourth embodiment according to the invention.

FIG. 1 depicts the furnace 1 in which a sheet of glass 2 travels along a roller conveyor 3. During the time it spends in the furnace 1, the sheet of glass 2 is raised to its softening temperature. The sheet of glass 2 is then led, still supported by the conveyor 3, to a bending station 4. In the bending station 4, there is a frame 5 under the plane defined by the roller conveyor 3. When the sheet of glass 2 arrives over this frame, members which have not been depicted in the figures allow said sheet of glass to be positioned precisely then its movement is halted by stopping the rollers in the bending zone. The bending frame 5 then passes up through the bed of rollers 3 to lift the sheet of glass. As mentioned earlier, the bending frame 5 has the shape that is to be given to the sheet of glass and is designed so that it can pass through the bed of rollers 3; either the frame 5 is interrupted, or the rollers in the bending zone are designed to allow the frame 5 to pass from a low position to a high position, for example using systems of the hydraulic ram type. Such embodiments are known to those skilled in the art. The bending frame 5, having picked up the sheet of glass 2, presses it against a bending form 6, advantageously a solid one, positioned above the frame 5.

In the case of a sheet of glass 2 intended to equip the lateral parts of motor vehicles, the direction in which the sheets of glass 2 travel on the roller conveyor 3 is dictated so that an observer looking face-on at a motor vehicle cannot see any marks that may have been left by the rollers of the conveyor 3 regardless of the angle from which he is looking. As was explained before, it is necessary not to be able to see marks which might have a vertical direction on the sheet of glass 2 when the latter is in place on a motor vehicle. This means that the axis of rotation of the rollers of the conveyor 3 needs to correspond to the horizontal direction of the sheet of glass 2 when the latter is mounted on a motor vehicle.

Moreover, the main curvature that needs to be given to the sheet of glass 2 is oriented in the vertical direction of the sheet of glass when the latter is on a motor vehicle. This means that the main direction of curvature given to the sheet of glass 2 after pressing is at right angles to the orientation of the rollers of the conveyor 3. If the sheet of glass 2 were to need to be set back down onto this conveyor 3 after pressing, said conveyor 3 would not be in a position to receive said sheet of glass 2 satisfactorily in order to maintain its shape and not risk breaking it, said sheet of glass 2 being supported only by its central part; such a position would inevitably lead either to additional deformation of the sheet of glass 2 which is not completely supported and is still at a high temperature or to the sheet of glass 2 toppling, leading to probable breakage upon contact with a roller of the conveyor.

The technique of the invention described in particular in FIGS. 2 to 6 makes it possible to prevent these risks and to maintain the desired shape already conferred upon the sheet of glass 2 during pressing in the bending station. The invention consists in receiving the sheet of glass on a shuttle comprising shaped rollers the arrangement of which is designed so that the concave shape of the rollers supports the main curved shape of the sheet of glass.

Figure 2:
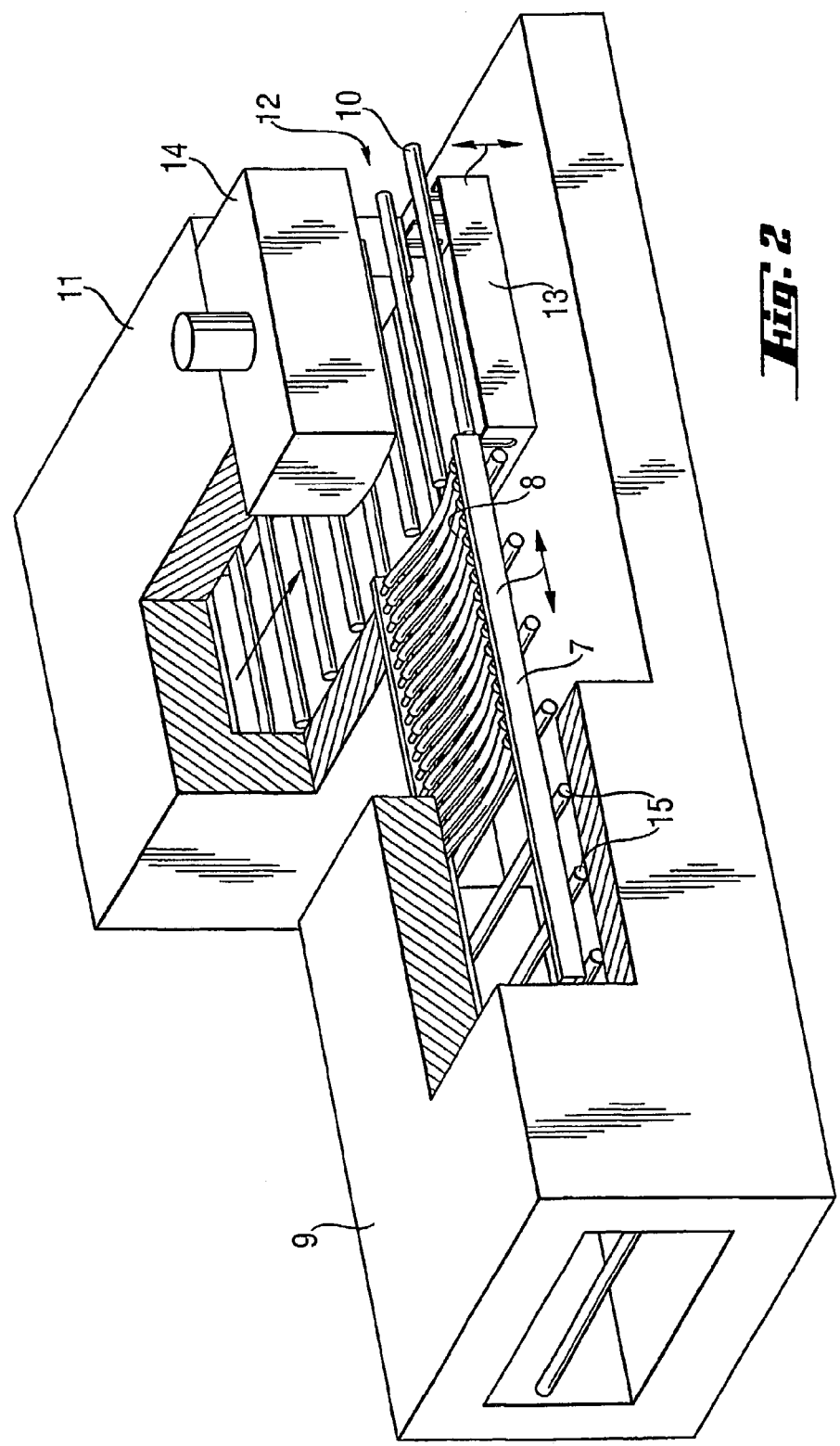
Figure 2A:
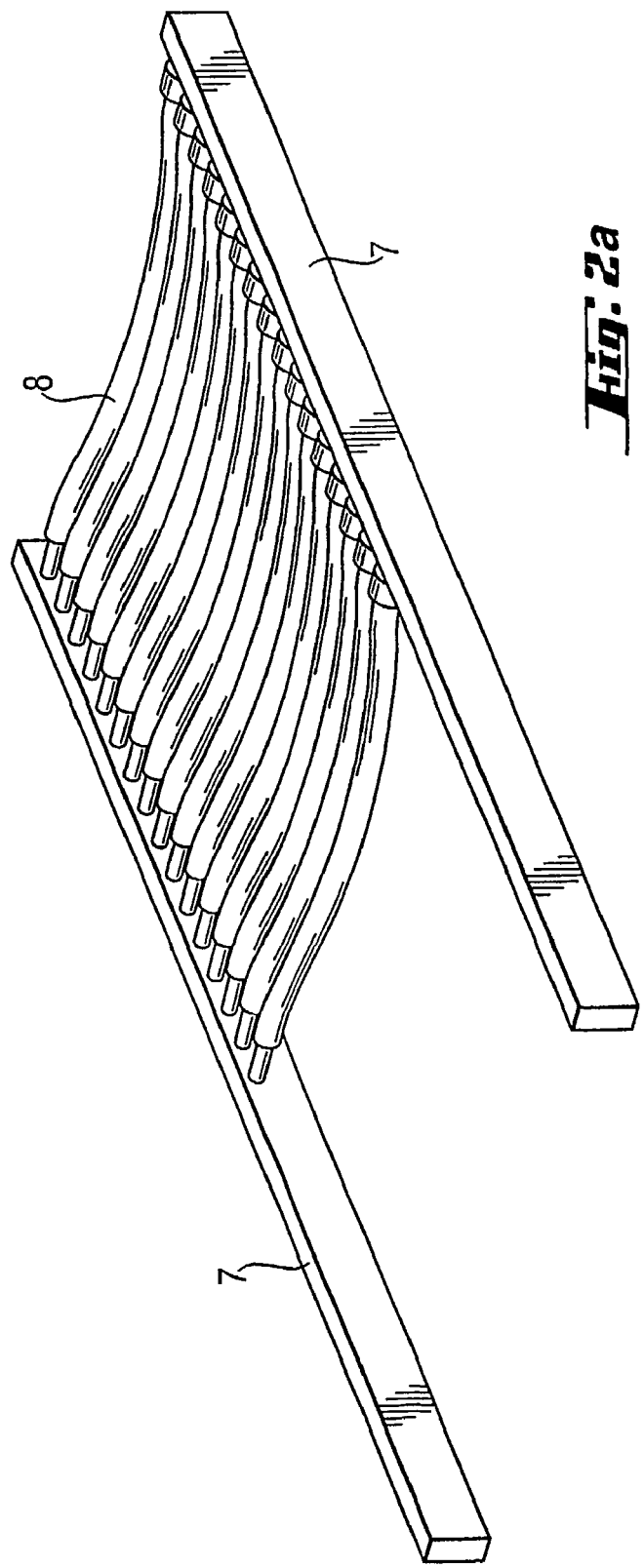

FIG. 2 illustrates a device according to the invention in which the sheet of glass 2 is set down after pressing onto a shuttle 7 comprising shaped rollers 8 and is then led to a cooling station 9 arranged in a path perpendicular to the conveying conveyor 10 passing through the furnace 11 and leading the sheet of glass 2 to the bending station 12. The shuttle 7 and its shaped rollers 8 is better illustrated in FIG. 2a. The principle of operation of the invention consists, when the sheet of glass 2 reaches the bending station 12, in picking it up on the bending frame 13 which presses it against the upper form 14. Suction means, not depicted in the figures, then hold the sheet of glass in contact with the upper form while the bending frame 13 drops back down into its lower position and the shuttle 7 is inserted between the conveyor 10 and the upper form 14. The suction means are then stopped and the sheet of glass is received by the shaped rollers 8 of the shuttle 7. As an option, blowing means may be provided to assist with setting the sheet of glass down. A downward vertical movement of the upper form 14 before it releases the sheet of glass onto the shuttle 7 may be anticipated. The shuttle 7 is then moved to the cooling station 9 and the sheet of glass 2 is transferred from the shuttle 7 to the cooling conveyor 15 which passes through said cooling station 9. Transfer is performed by rotating the shaped rollers 8, using any means known to those skilled in the art and not depicted in the figures. Furthermore, these means rotating the shaped rollers 8 may be actuated as soon as the sheet of glass 2 is set down on the shuttle 7 to prevent the sheet of glass from remaining motionless and thus prevent any risks of the glass being marked by the rollers 8. It is also possible to anticipate alternating rotation of the rollers 8 so as to obtain a back-and-forth movement on the shuttle 7 while the latter is moving to the cooling station 9. As regards the movement of the shuttle 7, this may be as far as the entry to the cooling station 9, or alternatively, the shuttle 7 may enter said cooling station and transfer the sheet of glass to the conveyor 15, for example when the sheet of glass 2 is perfectly set.

Of course, the depiction given in FIG. 2 may be embodied symmetrically, that is to say the cooling station 9 could be on the left of the conveying conveyor 10. The invention also anticipates the possibility of having two cooling stations 7, one to the left and the other to the right, then associated with two shuttles 7.

Figure 3:
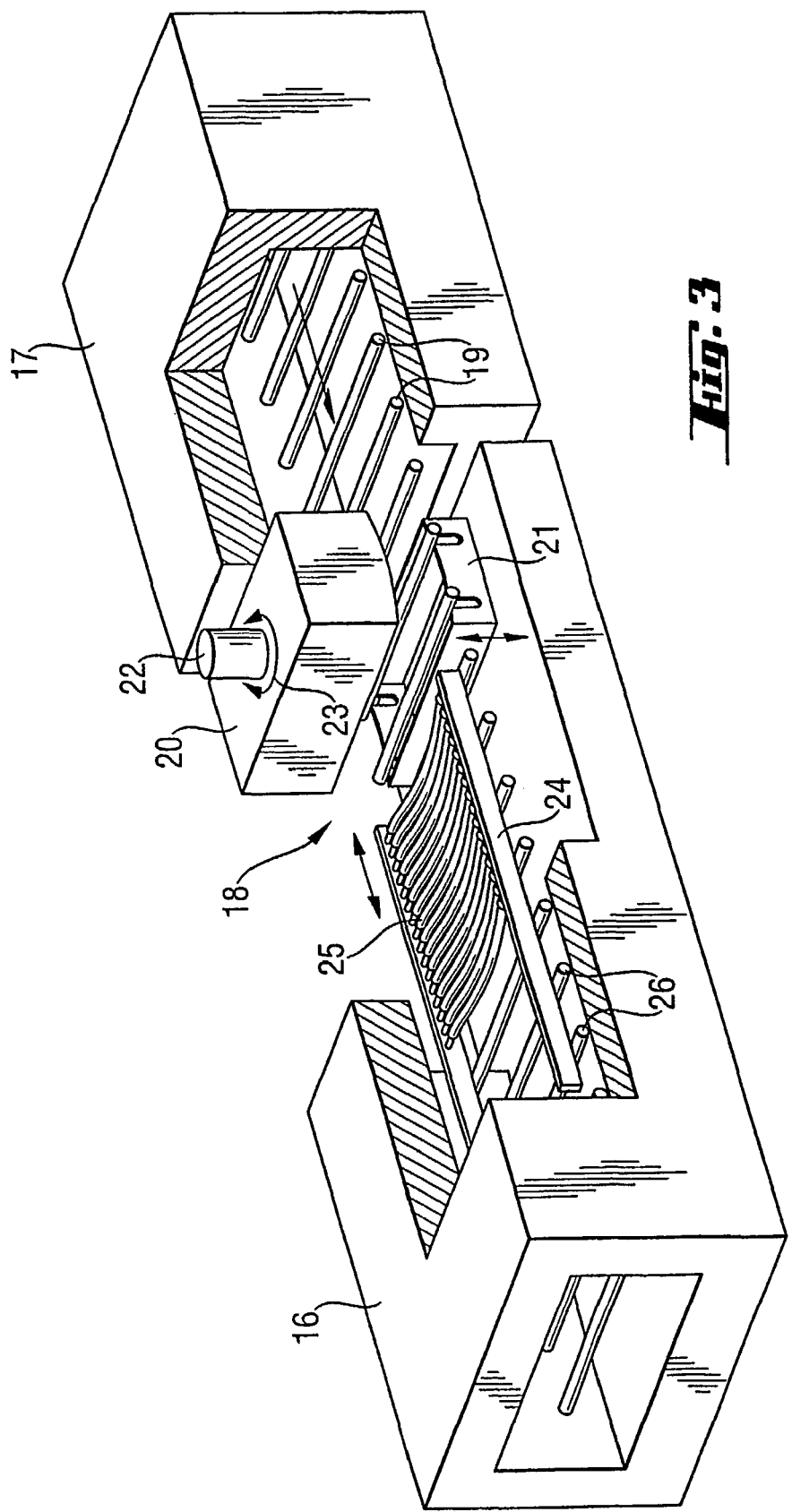
Figure 4:
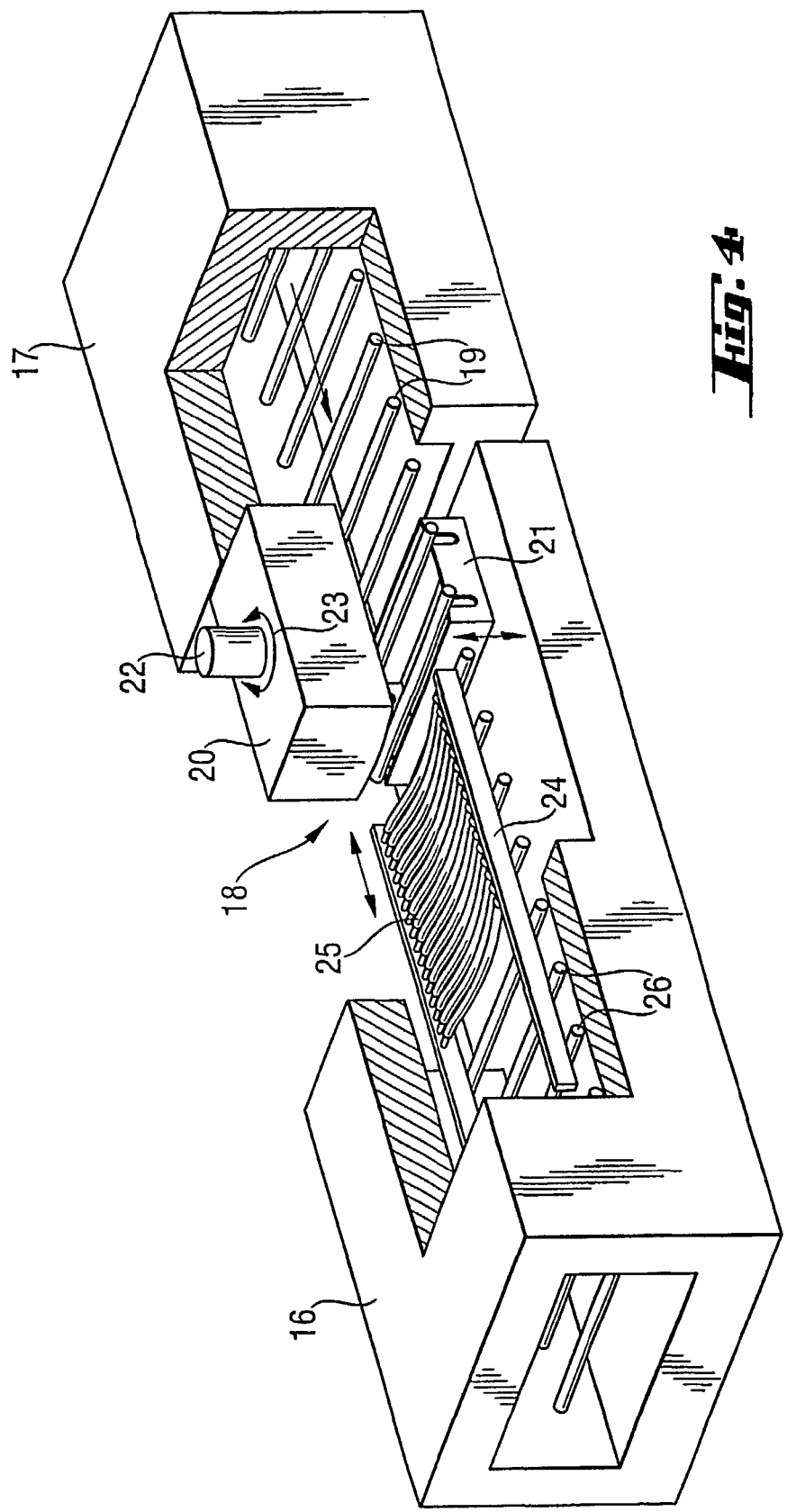

FIGS. 3 and 4 illustrate another exemplary embodiment of the invention whereby the cooling station 16 is installed in alignment with the furnace 17, the bending station 18 and the conveyor 19 passing through the furnace 17 and conveying the sheet of glass 2 to the bending station 18. The principle of operation of the tooling is identical to that of the embodiment of FIG. 2, the essential difference consisting in rotating the sheet of glass through an angle of 90° while the sheet is still in contact with the upper form 20 and immediately after pressing between said upper form 20 and the lower frame 21. The sheet of glass is rotated by rotating the upper form about a support axle 22, this rotation being illustrated by the arrow 23. The sheet is then set back down, as in the case of FIG. 2, onto the shuttle 24 comprising shaped rollers 25. The shuttle 24 then moves to a cooling station 16 and the sheet of glass 2 is transferred to the cooling conveyor 26. FIG. 3 thus illustrates this embodiment when the upper form 20 is in a pressing position and FIG. 4 illustrates the same embodiment with the upper form 20 having been turned through an angle of 90°.

Figure 5:
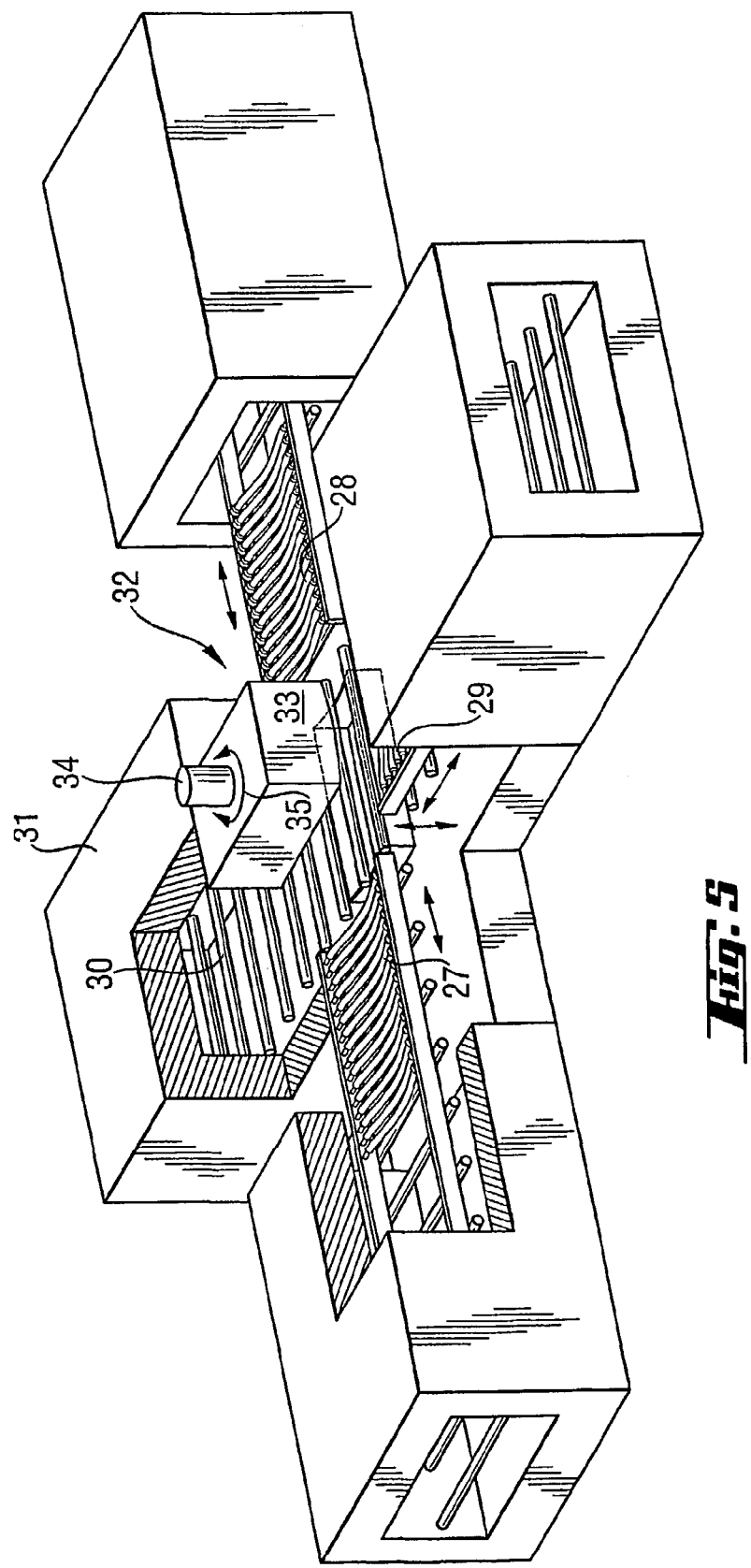

FIG. 5 is a last exemplary embodiment whereby there are three shuttles 27, 28, 29, associated with three cooling stations, not depicted in this figure. The three shuttles make it possible, in the case of two of them, 27 and 28, to transfer the sheets of glass laterally as illustrated in FIG. 2 and the third one 29 allowing the sheets of glass to be transferred into alignment with the conveyor 30, the furnace 31 and the bending station 32 as illustrated in FIGS. 3 and 4. The shuttle 29 of course works with an upper bending form 33 associated with an axle 34 allowing a rotation through 90° indicated by the arrow 35.

The depiction given in this FIG. 5 makes it possible, in particular, to optimize production rates, it no longer being possible for this to be limited by the time the shuttles spend in movement.

Figure 6:
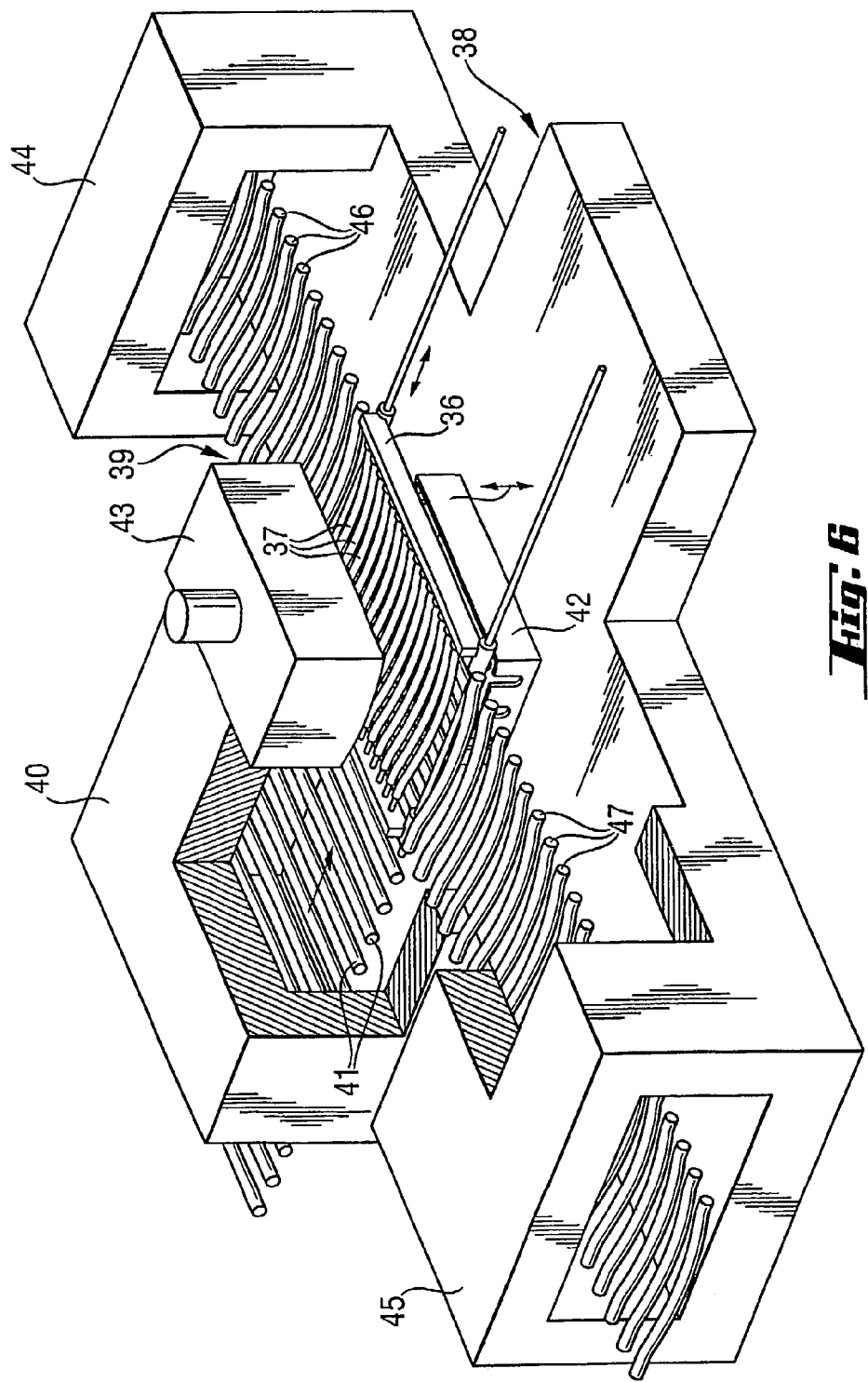
Figure 6A:
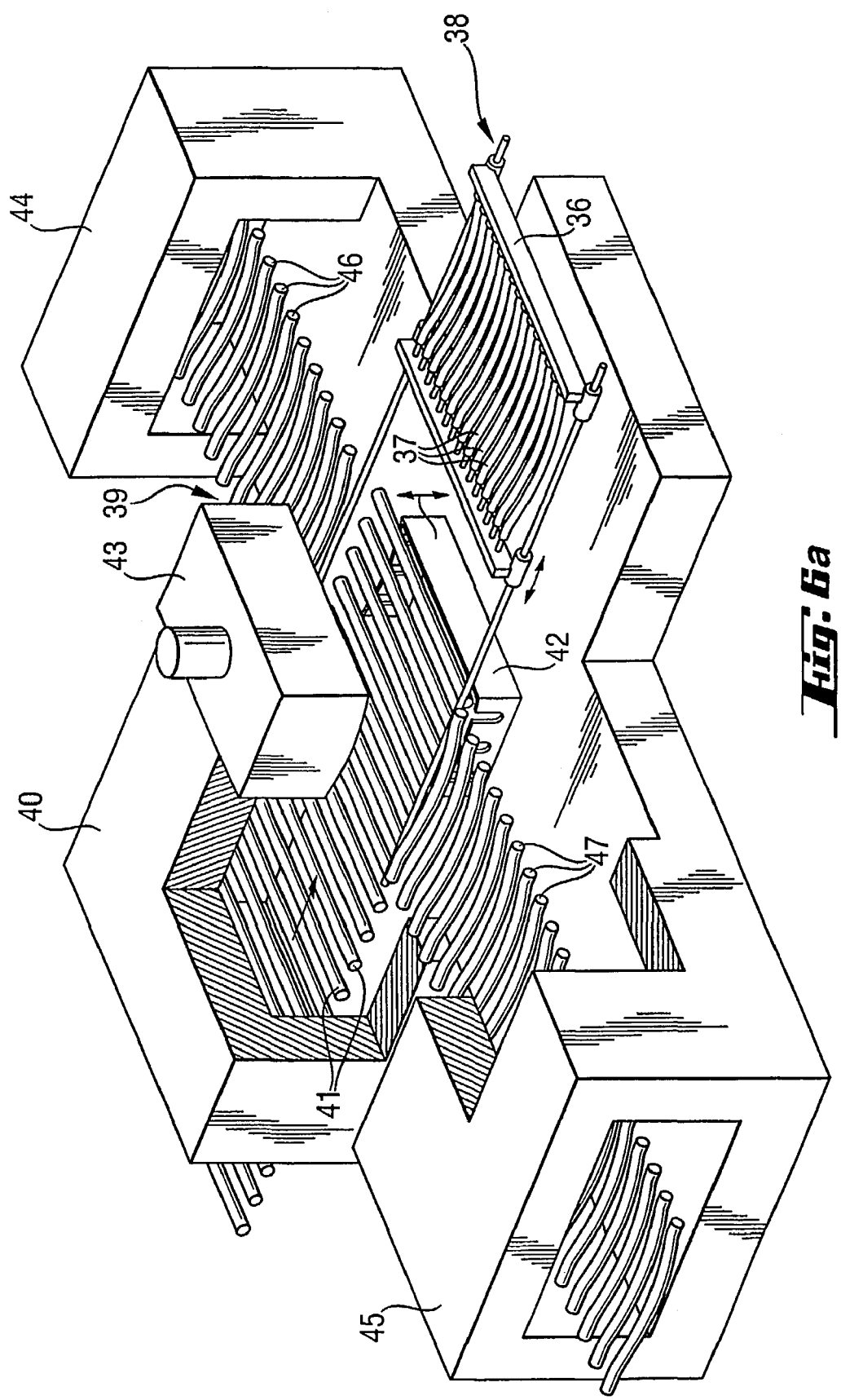

FIGS. 6 and 6a illustrate another embodiment of the invention whereby the shuttle 36 carrying the shaped rollers 37 can move between a standby station 38 and the bending station 39. As before, a sheet of glass from the furnace 40 and conveyed by a bed of rollers 41 is conveyed to the bending station 39 where it is bent using two forms 42, 43. The sheet of glass is then deposited back on the shaped rollers 37 of the shuttle 36. As soon as the sheet of glass is in contact with said shaped rollers 37, these are set in rotation by a device, not depicted in the figures, to drive the sheet of glass to a cooling station 44 or 45. The sheet of glass is thus transferred from the shaped rollers 37 to the rollers 46 or 47, which are also shaped. These shaped rollers 46 or 47 constitute a conveyor passing respectively through the cooling stations 44 and 45. The bent sheets of glass are thus removed, preferably every alternate one, to each of the cooling stations 44 and 45.

This embodiment of a device according to the invention illustrated by FIGS. 6 and 6a therefore consists in using a shuttle 36 that can move between the bending station 39 and the standby station 38. FIG. 6a illustrates the shuttle 36 positioned in the bending station 39 and therefore in position for removing a sheet of glass to one or other of the cooling stations 44, 45. FIG. 6a illustrates the shuttle 36 in the standby station and therefore during an operation of bending a sheet of glass.

The device thus depicted in FIGS. 6 and 6a makes it possible, as in the case of the alternative forms of the invention illustrated by FIGS. 2 to 5, to receive the bent sheet of glass on a shuttle comprising shaped rollers the arrangement of which is designed so that the concave shape of the rollers supports the main curved shape of the sheet of glass.

Furthermore, irrespective of the embodiment of the invention, the movements of these shuttles and possibly that of the upper form, and the triggering of the suction device to hold the sheet against the upper form and the rotating of the shaped rollers of the shuttle may be automated as may all the other steps during the bending and cooling of sheets of glass.

The invention claimed is:

1. A method for bending a sheet of glass comprising:
heating the sheet of glass to a softening temperature;
transporting the sheet of glass in an essentially horizontal path as far as a bending station for bending the sheet of glass between two forms;
shaping the sheet of glass by pressing the sheet of glass between the two forms;
cooling the sheet of glass in an appropriate cooling station, and
positioning a shuttle comprising shaped rollers configured to receive the sheet of glass after the sheet of glass has been bent, said shuttle being is being configured so as to be moveable between a said bending station and a cooling station or a standby station wherein the shaped rollers are oriented parallel to a direction defined on the sheet of glass by a direction in which the sheet of glass is conveyed into the bending station.

2. The method as claimed in claim 1, wherein the shaped rollers are configured on at least one shuttle, configured to move between the bending station and the cooling station.

3. The method as claimed in claim 1, wherein the sheet of glass is transported to the cooling station in a direction lateral with respect to the direction in which the sheet of glass is conveyed to the bending station.

4. The method as claimed in claim 1, wherein the sheet of glass is kept in contact with an upper bending form after pressing, wherein the sheet of glass undergoes a rotation through an angle of 90°, and wherein the sheet of glass is transported to the cooling station in the direction in which the sheet of glass is conveyed to the bending station.

5. The method as claimed in claim 1, wherein the sheet of glass can move on the at least one shuttle.

6. The method as claimed in claim 5, wherein the sheet of glass performs a back-and-forth movement on the at least one shuttle.

7. The method as claimed in claim 1, wherein the shaped rollers remove the bent sheet of glass to at least one cooling station in a direction lateral with respect to the direction in which the sheet of glass is conveyed to the bending station.

8. A bending device comprising:

a furnace for heating a sheet of glass;

a device for supporting and transporting the sheet of glass in an essentially horizontal plane through the furnace as far as a bending station comprising two bending forms, a lower bending form passing through the transport device to press the sheet of glass against an upper form, the upper form comprising means for holding the sheet of glass after the sheet of glass has been shaped; and at least one cooling station, wherein at least one shuttle carrying shaped rollers receives the sheet of glass after bending, wherein the sheet of glass can move between the bending station and another station, and wherein the shaped rollers are oriented parallel to a direction defined on the sheet of glass by a direction in which the sheet of glass is conveyed to the bending station.

9. The device as claimed in claim 8, wherein the shuttle can move between the bending station and the at least one cooling station.

10. The device as claimed in claim 8, wherein a direction of travel of the shuffle is lateral with respect to the direction in which the sheet of glass is conveyed from the furnace to the bending station.

11. The device as claimed in claim 8, wherein a direction of travel of the shuttle is in continuation of the direction in which the sheet of glass is conveyed from the furnace to the bending station, and wherein the upper form pivots through an angle of 90° after pressing.

12. The device as claimed in claim 8, wherein the shaped rollers are driven rollers.

13. The device as claimed in claim 8, wherein the shaped rollers have an alternating rotational movement.

14. The device as claimed in claim 8, wherein the shuttle enters the cooling station.

15. The device as claimed in claim 8, wherein the at least one cooling station includes at least one first cooling station in a continuation of the direction of the device for transporting the sheet of glass and at least one second cooling station arranged laterally with respect to said transport device.

16. The device as claimed in claim 8, wherein the shuttle is configured to move between the bending station and a standby station.

17. The device as claimed in claim 1, wherein the shaped rollers are rollers that are driven in at least one direction of rotation.

18. The device as claimed in claim 8, wherein the upper form comprises suction means.

19. The device as claimed in claim 8, wherein the upper form can move in a vertical direction.

20. The method as claimed in claim 1, wherein said shaped rollers are shaped so as to have a concave shape supporting a main curved shape of the sheet of glass.

* * * * *